United States Patent [19]

Williams et al.

[11] Patent Number: 4,680,139

[45] Date of Patent: Jul. 14, 1987

[54] ELECTROSTATICALLY CONDUCTIVE PREMOLD COATING

[75] Inventors: Charles F. Williams, Brunswick; Atam P. Sahni, Solon, both of Ohio

[73] Assignee: Ferro Corporation, Cleveland, Ohio

[21] Appl. No.: 728,084

[22] Filed: May 2, 1985

Related U.S. Application Data

[60] Division of Ser. No. 720,992, Apr. 8, 1985, Pat. No. 4,587,160, which is a continuation-in-part of Ser. No. 503,861, Jun. 13, 1983, abandoned.

[51] Int. Cl.$^4$ .............................................. H01B 1/06
[52] U.S. Cl. .................................... 252/511; 524/424; 524/847
[58] Field of Search ................ 252/511; 524/424, 847

[56] References Cited

U.S. PATENT DOCUMENTS

| | | | |
|---|---|---|---|
| 3,934,119 | 1/1976 | Trenkler | 219/543 |
| 3,934,285 | 1/1976 | May | 427/358 |
| 4,292,224 | 9/1981 | Theodore | 524/188 |
| 4,341,838 | 7/1982 | Imai et al. | 523/220 |
| 4,343,376 | 8/1982 | Tsukagoshi et al. | 524/496 |
| 4,404,315 | 9/1983 | Tsukagoshi et al. | 524/496 |

*Primary Examiner*—Lorenzo B. Hayes
*Attorney, Agent, or Firm*—Baldwin, Egan & Fetzer

[57] ABSTRACT

Resin is mixed with graphite particles to form a blendable, processable premold coating. When the premold coating is incorporated onto the surface of a premold coated molded plastic product produced by the premold process, said coating is rendered electrostatically conductive.

7 Claims, 2 Drawing Figures

ELECTROSTATICALLY CONDUCTIVE PREMOLD COATING

BACKGROUND OF THE INVENTION

This application is a division of Ser. No. 720,992 filed Apr. 8, 1985, now U.S. Pat. No. 4,587,160 which is a continuation-in-part of Ser. No. 503,861 filed June 13, 1983, now abandoned.

High volume molding of plastic parts yields a product which does not normally conduct electricity. When electrostatic spray painting of said product is attempted, electric charges retained in the part repel paint droplets and inhibit the coating process. It has been suggested to make the surface of the part conductive so that grounding would dissipate charges and facilitate painting.

U.S. Pat. No. 4,309,483 to Gravert discloses a carbon-doped, static-free, plastic ullage tape. The tape is made electrostatically conductive by exposing plastic film to soot from an open flame.

In U.S. Pat. No. 4,225,487 to Sanders, carbon black is incorporated into polymer filament used to manufacture static-free carpet. Adsorption of the conducting agent is accomplished by passing plastic fiber through a dispersion of carbon black in formic acid.

In U.S. Pat. No. 2,758,948, to Simon and Thomas, a coating for bleeding static electricity from aircraft windshields is formed by buffing finely divided graphite into the plastic canopy.

U.S. Pat. No. 4,349,601, to Brueggemann, claims a skin on molded plastic parts, produced by the premold process, containing sufficient carbon black to render the surface electroconductive. The Brueggemann product is made by electrostatically spraying a powdered mixture of carbon black and partially cured resin against a hot mold surface, fusing the particles to form a continuous film, adding a bulk fill resin, closing the mold and curing both simultaneously. While electrical properties of the patented product are good, commercial manufacture is difficult. Carbon black, because of its high surface area, has a high resin demand and small amounts of carbon black absorb large amounts of partially cured resin. (Paints, Dyestuffs and Lakes, Part 6, Reinhold Publishing 1966, p. 207 reports lampblack to have an oil absorption of 286). At carbon black concentrations sufficient to provide electrostatic conduction in the final product, mixtures of carbon black and partially cured resin are too viscose to extrude or process. Separate components remain aggregated and the plastic part finally produced has neither the smoothness nor surface conductivity desired. Roll Milling of mixtures containing requisite amounts of carbon black is also uneffective. Extrusion mixing, with its greater shear, can provide adequate blending. Nevertheless, the intimate mixture of carbon black and partially cured resin becomes so rigid that extrusion equipment frequently plugs and becomes inoperative.

The use of graphite to give polymeric materials sufficient conductivity to disperse static electric charges is known. However, the inclusion of graphite in the skin of a molded plastic part produced by the premold process appears unknown.

SUMMARY OF THE INVENTION

The present invention relates to an improved formulation for use in premold coating of molded plastic parts, said formulation comprising a blendable, processable mixture of partially cured resin and sufficient agent to render the resultant part surface electrostatically conductive.

This object is achieved, and the disadvantages of the prior art are obviated, by employing graphite as an additive. The graphite used may be in the form of flakes or fibers or combinations thereof. Carbon content of the graphite is typically 96%, the remainder being ash. Preferably, the graphite flakes have a maximum size of about 80 microns, the preferred range being from about 5 to about 80 microns. Typically, 99% of such flakes pass through a 325 mesh screen. Preferably, the graphite fibers have a length of about 300 microns. In one formulation graphite flakes are blended with a partially cured thermosetting resin preferably produced by reacting an organic glycol of about 2 to about 12 carbon atoms with a dicarboxylic acid having from about 2 to about 16 carbon atoms. Preferably the resin contains a cross-linking agent, often unsaturated, as well as a catalytic amount of a catalyst such as a peroxide. The resin may also contain a flow agent, a pigment, an inorganic filler and the like.

By "premold" coating, or process, as used herein, is meant a coating achieved, or a method of producing a coated plastic article, whereby the outer layer of the finished article is first applied to hot mold surfaces, immediately followed by adding SMC or other suitable resin fill material to the mold, whereupon the mold is closed and the coating and fill material simultaneously taken to a final and complete cure. When removed from the mold, the coating is chemically bonded to the structural fill material.

While coating and fill resins of this invention are preferably, predominantly unsaturated polyesters, the present invention is compatible with any thermosetting resin system adaptable to the premold process.

The various features of the invention and the benefits derived therefrom will be apparent from the following description taken in conjunction with the accompanying drawings.

DESCRIPTION OF THE PREFERRED EMBODIMENT

Figure 1:
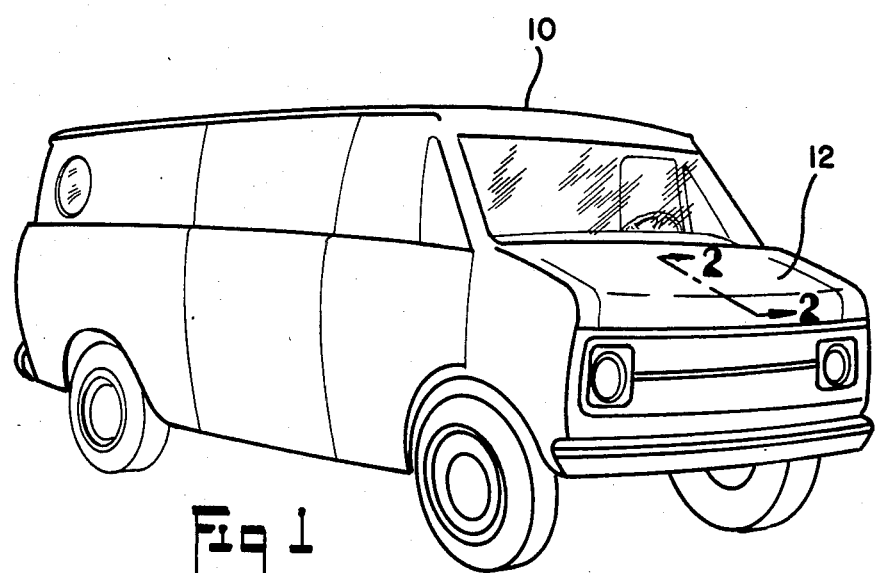
FIG. 1 is an illustration of a vehicle embodying a plastic part made in accordance with the invention.

Specific permold coatings according to the present invention, conditions employed in their use and the nature of the product formed from them are shown in the following examples.

EXAMPLE 1

A ten pound batch of materials was made, having weight percentages as follows:

| | |
|---|---|
| 50.2% | Resins in a 3:1 ratio of AROPOL 7501 (Ashland Chemical) and E-720 (Owens Corning), respectively. |
| 17.0% | Diallyl Phthalate Prepolymer |
| 1.28% | Tertiary Butyl Perbenzoate Catalyst |
| .02% | Cure Promoter |
| 2.0% | Calcium Carbonate Filler |
| 2.0% | Zinc Oxide Filler |
| 0.9% | Styrene Allyl Alcohol Resin Extender |

| | | |
|---|---|---|
| .3% | Fluorocarbon Release Agent FC 430 (Minn. Mining & Mfg.) | |
| 1.5% | Release Agent | |
| 23.0% | Graphite Flakes Asbury #146 (Asbury Graphite Mills) (Maximum Size 80 Microns) | |

The materials were placed in a Welex Model 20M mixer taking care that promoter and initiator did not come into gross contact with each other. The components were mixed at 1000 RPM for two minutes. Materials were swept down from the sides of the container and mixing was performed for an additional minute at 2000 RPM. Alternatively the graphite flakes can be left out during the first mixing phase and only subjected to one period of agitation. This procedure tends to preserve the plate-like structure of graphite flakes needed for electrical conductivity in the outer layer or coating of the final, premold coated article.

The mixed material was extruded using a Baker-Perkins MP-216 co-rotating twin screw extruder. During operation of the barrel and screw of the extruder were maintained at 150° F. and the die at 50° C. Higher temperatures should be avoided as resin may polymerize and set up within the extruder otherwise. The screws turned at 350 RPM. The orifice remained open and the extruder was starve fed. These conditions minimize sheer on the graphite flakes and insure good electrical conductivity in the plastic item finally fabricated. Alternatively, two extrusion phases may be employed wherein graphite flakes, initiator(s) and release agent(s) are excluded from the first phase. Also, extrusion may be achieved using a Buss PR-47 kneader extruder operated at 290 RPM with barrel and screw temperatures of 45°-50° C. and 35° C., respectively.

The material leaving the extruder was a molten liquid. The molten liquid was passed through a set of chill rolls. The chill rolls pressed the mix into a sheet which was then broken into large flakes. The broken flakes were fed into a liquid nitrogen cooled hammer mill and ground to provide a coarse powder capable of passing through a 100 mesh screen.

The 100 mesh product was put into the feed hopper of a GEMA Molel 708 (St. Gallen, Switzerland) electrostatic spray handgun. The powder was sprayed against one of two matched male or female molds employing a gun voltage of 30-100 Kv. The temperature of the mold surface was 280°-320° F. Spray was directed against the one square foot flat plaque mold for 12 seconds. Powder was applied to achieve a final thickness of 3-5 mils. After 37 seconds dwell time a 525 gram charge pattern of sheet molding compound was carefully laid into the mold. The mold was closed, closure being achieved after 11 seconds. The mold remained closed to 1½ minutes with the sprayed mold surface at 280°-320° F. and the unsprayed mold surface at 275°-285° F. Then the mold was opened and the molded part was removed. The premold coating or outer surface was free from blemishes and tears, was black in appearance and conformed to the contours and texture of the mold. Ten such parts were made and tested for electrical conductivity.

Electrical conductivity of the premold coated surface containing graphite flakes was measured using a Model 8333-00 Ransburg Sprayability Meter (Indianapolis, Inc.). When meter probes were touched firmly to various portions of the coated surface, conductivity readings of 125-160 were recorded. Experience shows that a meter reading of 125 indicates sufficient surface conductivity to allow successful spray painting by electrostatic application methods known in the art.

EXAMPLE 2

Example 1 was repeated using 20.0% graphite flakes and 3.0% Thorel VMD graphite fibers approximately 300 microns in length, all other chemical components and procedural conditions remaining constant. Electrical conductivity of various portions of the coated surface containing graphite flakes and fibers was measured to be 125-165+ using a Ransberg Sprayability Meter. Field trails of this premold coating incorporated onto intricately shaped production parts yielded items with surface conductivities of 165+.

EXAMPLES 3-11

Various percentage amounts of graphite flake, fiber and inorganic fillers were used to produce additional premold coatings according to this invention. Table 1 shows the percentage and type of graphite and filler employed. In each instance the balance of the coating mixture was composed of resins, prepolymer, catalyst, filler, cure agent, resin extender and release agent maintained in proportion to each other as in Example 1.

TABLE 1

| Example # | % Graphite Flake | % Graphite Fiber | % Filler | Ransburg Meter Reading |
|---|---|---|---|---|
| 3 | 0 | 25.0 | 0 | 75-80 |
| 4 | 15.0 | 0 | 0 | 70-150 |
| 5 | 15.0 | 3.0 | 10.0% BaSO$_4$ | 125+ |
| 6 | 10.0 | 5.0 | 10.0% BaSO$_4$ | 125-145 |
| 7 | 15.0 | 0 | 6.6% TiO$_2$ 16.8% CaCO$_3$ 18.1% BaSO$_4$ 0.1% C | 75-150 |
| 8 | 12.5 | 0 | Same as Ex. 7 | 75-140 |
| 9 | 10.0 | 0 | Same as Ex. 7 | 70-130 |
| 10 | 7.5 | 0 | Same as Ex. 7 | 70-125 |
| 11 | 5.0 | 0 | Same as Ex. 7 | 71 |

Experience indicates that graphite contents as high as 30% might be blendable, processable and may produce useful premold coatings.

Figure 2:
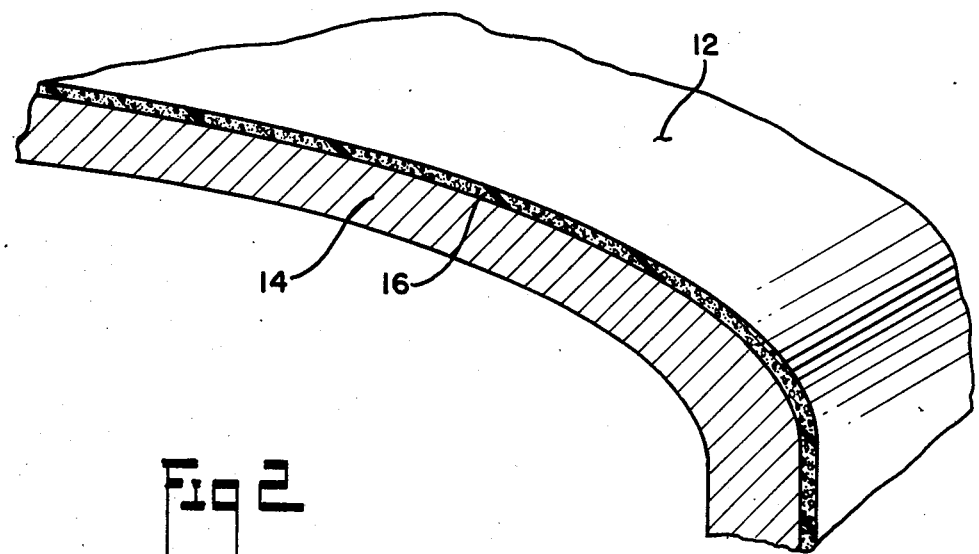
FIG. 2 is a partial sectional view taken generally along one plane of line 2—2 of FIG. 1, looking in the direction of the arrows and illustrating the coated surface of the part in section.

FIG. 1 is an illustration of a vehicle 10 embodying a plastic part 12 made in accordance with this invention. FIG. 2 is a sectional view of the plastic part 12 comprising a bonded surface coating 16 and underlying part matrix 14, said surface coating 16 containing sufficient graphite to render the part surface electroconductive.

We claim:

1. A powdered electroconductive coating composition having a particle size of at least 100 mesh adaptable to be applied and cured to a final, finish coating over a compatible synthetic resinous substrate and chemically bonded thereto, the powdered composition comprising a partially cured, thermosetting synthetic resin having graphite dispersed throughout each particle, wherein the graphite is in the form of flake having a particle size of about 5 to 80 microns, or a mixture of said graphite flake and graphite fiber and is present in sufficient quantity to render said cured coating electroconductive.

2. The coating composition of claim 1, adaptable to be applied to said resinous substrate by the premold process.

3. The coating composition of claim 1, wherein said graphite is present in about 23 weight percent.

4. A powdered electroconductive coating composition having a particle size of at least 100 mesh and being curable to provide a cured electrostatically conductive coating on a premold plastic part, the powdered coating composition comprising a partially cured, thermosetting synthetic resin having dispersed in each resin particle an effective electroconductive-providing amount of graphite flake having a particle size of about 5 to 80 microns or a mixture of said graphite flake and graphite fiber in which the fiber has a length of about 300 microns.

5. A composition as defined in claim 4 in which the synthetic resin is an unsaturated polyester.

6. A composition as defined in claim 4 in which the synthetic resin is a partially cured unsaturated polyester and the composition includes a crosslinking agent and a polymerization catalyst for further curing the polyester resin to provide a cured electrostatically conductive coating.

7. A composition as defined in claim 6 in which the crosslinking agent is a diallyl phthalate prepolymer and the catalyst is tertiary butyl perbenzoate.

* * * * *